May 28, 1963 H. LEIBERMAN 3,091,209
WATER TRICYCLE

Filed Nov. 4, 1960 3 Sheets-Sheet 1

INVENTOR.
Harry Leiberman
BY
ATTORNEY.

May 28, 1963 H. LEIBERMAN 3,091,209
WATER TRICYCLE
Filed Nov. 4, 1960 3 Sheets-Sheet 2
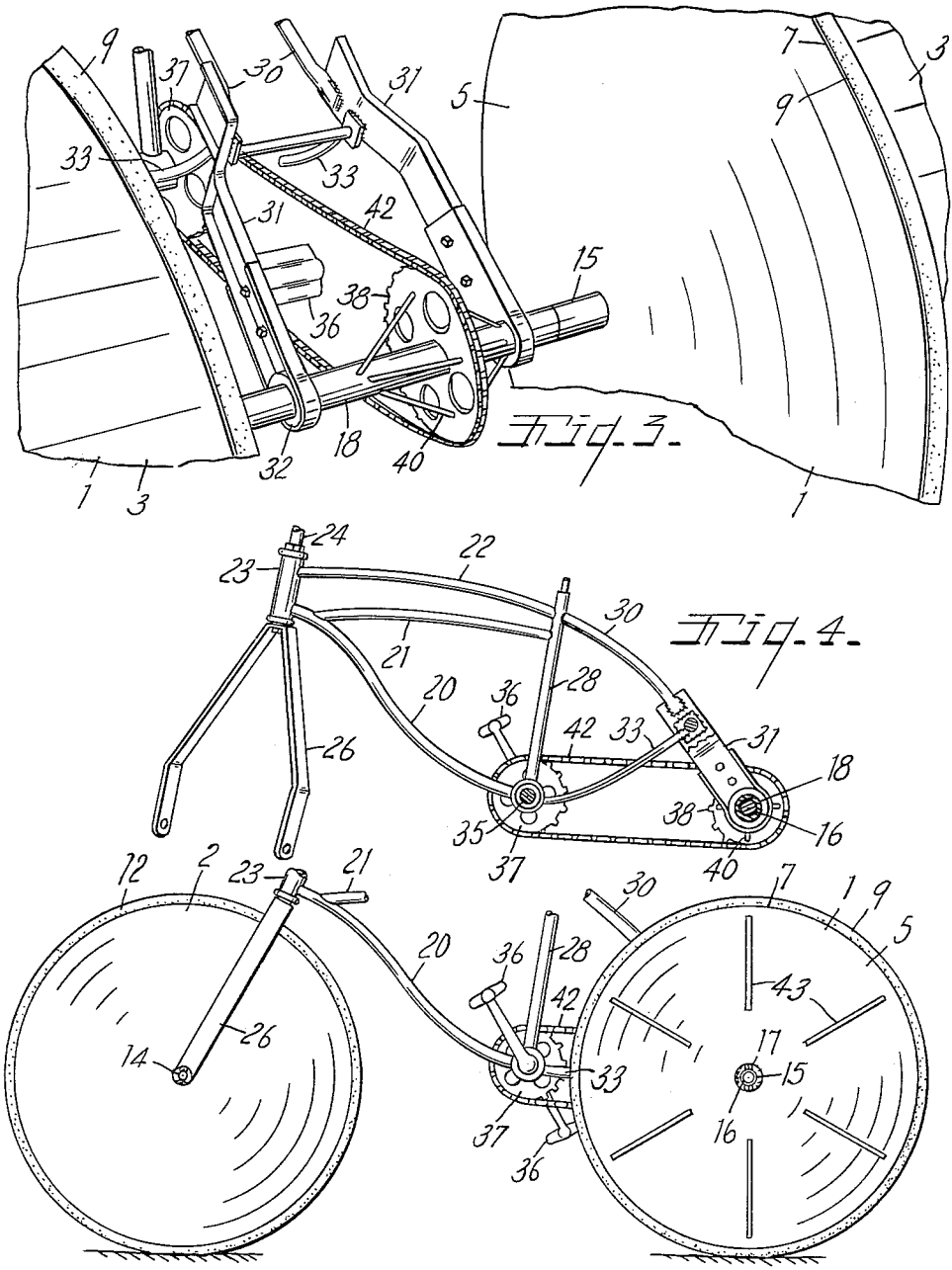
INVENTOR.
Harry Leiberman
BY
ATTORNEY.

May 28, 1963  H. LEIBERMAN  3,091,209
WATER TRICYCLE
Filed Nov. 4, 1960  3 Sheets-Sheet 3
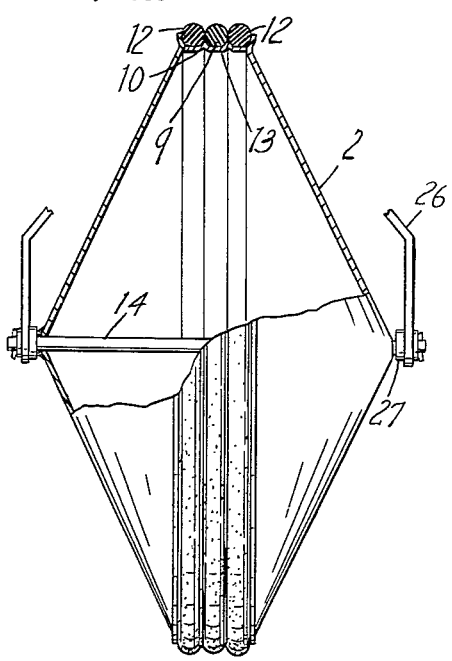
Fig. 6.
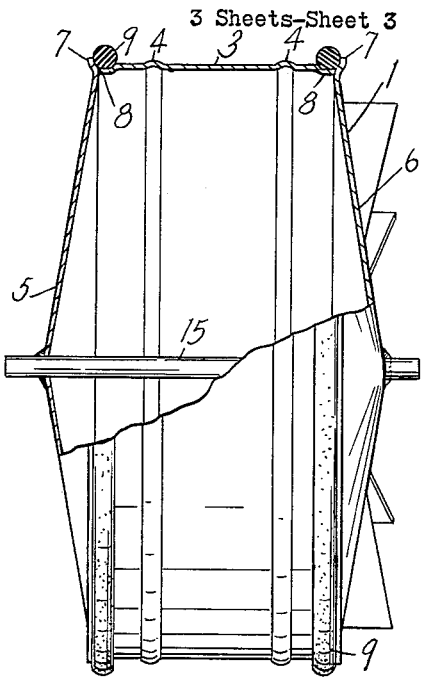
Fig. 7.
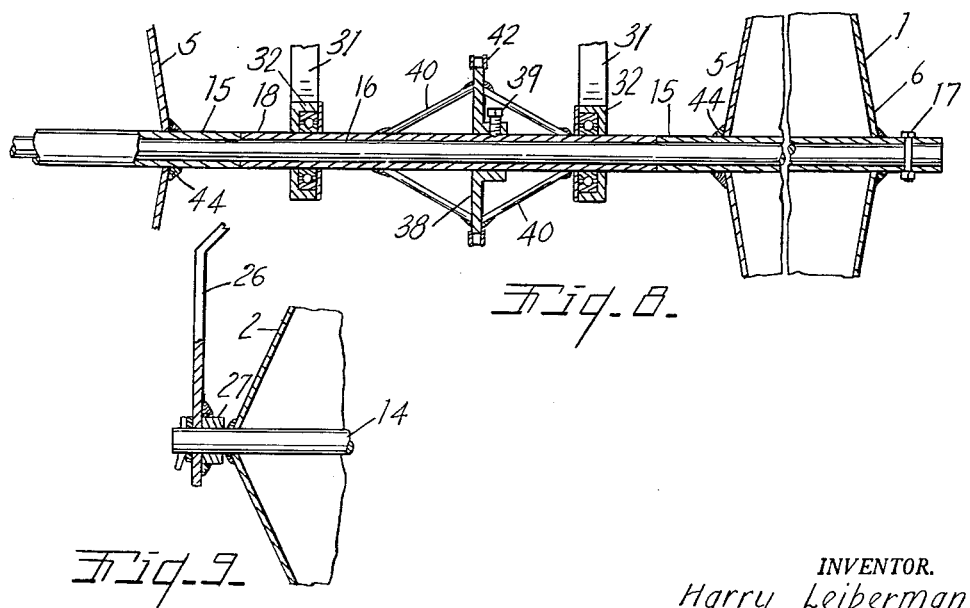
Fig. 8.
Fig. 9.
INVENTOR.
Harry Leiberman
BY
ATTORNEY.

United States Patent Office 3,091,209
Patented May 28, 1963

3,091,209
WATER TRICYCLE
Harry Leiberman, Watervliet, Mich.
Filed Nov. 4, 1960, Ser. No. 67,332
6 Claims. (Cl. 115—2)

This invention relates to tricycles adapted for use on land or on hard surfaces and in water. The main objects of this invention are, First, to provide a tricycle which is adapted to be manually operated both on a hard surface such as land or ice, roads, pavements, or the like, and in water without any modification or shifting or changing of parts thereof.

Second, to provide a tricycle adapted for such uses which is strong and durable and at the same time is relatively light in weight and easy to operate, both on a hard surface and in water.

Third, to provide a tricycle having these advantages which is attractive in appearance.

Objects relating to details and economies of the invention will appear from the description to follow. The invention is defined and pointed out in the claims.

A preferred embodiment of the invention is illustrated in the accompanying drawing, in which:

FIG. 3 is a fragmentary rear perspective view.

FIG. 4 is a fragmentary view of the frame and steering means, certain of the parts being shown in section.

FIG. 5 is a fragmentary side elevational view illustrating the tricycle supported on a hard surface.

FIG. 6 is an enlarged fragmentary view of the front wheel and its axle and support partially in vertical section on a line corresponding to line 6—6 of FIG. 2.

FIG. 7 is an enlarged fragmentary view of one of the rear wheels partially in vertical section on a line corresponding to line 7—7 of FIG. 2.

FIG. 8 is an enlarged fragmentary view partially in transverse section illustrating structural details of the mounting and driving connections for the rear wheels.

FIG. 9 is a fragmentary view partially in section illustrating the mounting for the front wheel.

Figure 1:
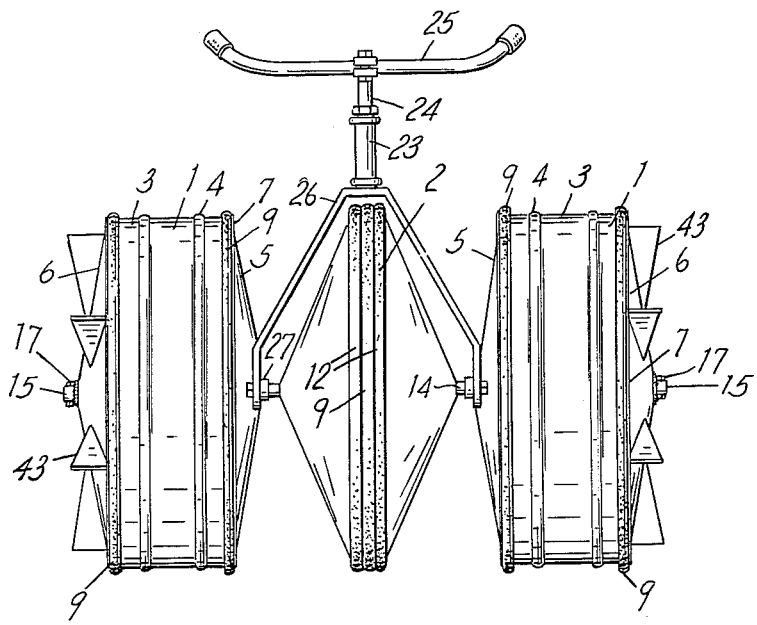
FIG. 1 is a front view of an embodiment of my invention.
Figure 2:
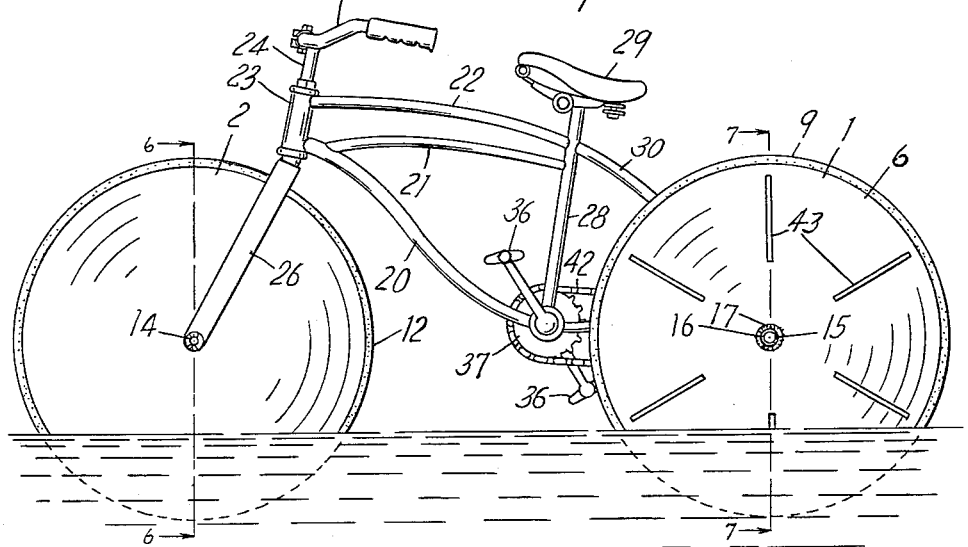
FIG. 2 is a side elevational view illustrating the tricycle in water.

The embodiment of my invention illustrated is adapted for use both on a hard surface, land, pavement, ice or the like, and in water. It is desired to point out, however, that certain features relate particularly to use in water and would be of importance if the tricycle were designed for use only in water. The embodiment of my invention illustrated comprises the rear wheels 1—1 and front wheel 2, all three of which are designed to constitute air chambers. The rear wheels 1 comprise the rims or treads 3 which are of substantial width, and in the embodiment illustrated are provided with annular reinforcing ribs 4. The inner and outer side walls 5 and 6 are of conical shape and their outer edges or peripheral edges 7 project beyond the tread 3 and constitute outer walls for the tire seats 8, the tread being inset to coact with these rim portions 7 to provide seats for the tires 9 which are desirably of solid resilient material, although a substantial degree of resilience is not required.

The front wheel 2 comprises the rim or tread 10 and the conical side members 11, which desirably have more dish than the side members of the rear wheels, as clearly appears from FIGS. 6 and 7. In this embodiment, the side walls are duplicates but disposed in oppositely facing relation and are secured to the tread to project thereon to constitute walls for the outer tire seats 12, there being an intermediate tire seat 13 in this embodiment. The tires 9 are the same as the tires on the rear wheels. The front wheel side walls are fixedly secured to the axle 14 which projects therefrom. The rear wheels are fixedly secured to the tubular hubs 15, see FIG. 8, which are mounted on the rear axle 16 and secured thereto as by the bolts 17. The tubular driven shaft 18 is disposed on the axle 16 between these hubs and is fixedly connected thereto at 19.

The supporting frame comprises longitudinally extending frame members 20, 21 and 22, which are connected at their front ends to the bearing 23 for the steering post 24, which is provided at its upper end with the handles 25, and has the yoke 26 extending downwardly from its lower end in straddling relation to the front wheel and provided with bearings designated generally by the numeral 27 for the arms of the yoke. The frame includes the post 28 upon which the seat 29 is mounted. It also includes the rearwardly projecting arms 30 which terminate in the laterally spaced brackets 31 provided with bearings 32 for the driven shaft 18, struts 33 being provided to support these bracket members.

The driven shaft 35 is rotatably mounted at the lower end of the post 28 and is provided with pedals 36 and has a driving sprocket 37 thereon. The drive shaft 18 is provided with a sprocket wheel 38 which is secured by means of the set screw 39 and the braces 40, see FIG. 8. The bearings 41 are desirably of the roller type, see FIG. 8. The sprocket wheel 38 is connected to the sprocket wheel 37 by means of the sprocket chain 42.

The outer walls 6 of the rear wheels are provided with angularly spaced radial propeller blades 43, which are desirably and in the embodiment illustrated of triangular shape and they are fixedly secured to the outer walls of the wheels with their outer edges in inwardly spaced relation to the peripheries of the wheels, as is clearly illustrated. It will be noted that the rear wheels are of substantial width and they coact to provide load supporting floats, the load being mainly on the rear wheels owing to the positioning of the seat relative to the rear axle. The tread of the front wheel is of less width than the tread of the rear wheels so that it can be readily steered both on land and in water.

The tires which as stated are of relatively hard rubber or the like protect the wheels and provide desirable traction when the tricycle is operated on a hard surface. These rubber tires or treads are desirable both when the tricycle is operated on ice or on land or pavements or the like.

The fixedly connected parts are desirably connected by solder or welds as indicated at 44 in FIG. 8, for example, but such connections are not further described. With the parts arranged as illustrated, the wheels may be formed of relatively light material and at the same time are strong and rigid. One of the attained objects is that the entire structure is relatively light and at the same time is strong and durable.

I have illustrated and described my invention in a highly practical embodiment thereof. I have not attempted to illustrate or describe certain modifications and adaptations which might be desirable for particular uses, as the structure illustrated is adapted for use both on land and water by people skilled in using or manipulating bicycles on land.

Having thus described the invention, what is claimed as new and desired to secure by Letters Patent is:

1. A tricycle usable on a hard surface and on water, comprising air chambered front and rear wheels, the rear wheels comprising rims and conical side walls fixedly connected thereto, the rims of the rear wheels being of equal and substantial width and having axially spaced annular ribs thereof and having axially spaced tire seats at the ends thereof, the side walls of the rear wheels projecting outwardly beyond the rims to provide outer walls for said tire seats, the rim of said front wheel being provided with a plurality of side by side tire seats, the side walls of said front wheel projecting outwardly beyond the rim to constitute the outer walls for the outer tire seats thereon, tires arranged in said tire seats, the tires on said front wheel being disposed in side by said lateral supporting relation to each other, inwardly tapering propeller blades disposed radially and in angularly spaced relation on the outer side walls of said rear wheels with their outer edges in inwardly spaced relation to the peripheries thereof, a rear axle, said rear wheels having tubular hubs sleeved upon and connected to said rear axle, said front wheel having an axle projecting laterally therefrom and to which the side walls of said front wheel are fixedly connected, a tubular driven shaft sleeved upon said rear axle between said hubs and drivingly connected thereto, a driven sprocket disposed centrally on and drivingly connected to said driven shaft, a frame including laterally spaced rearwardly projecting members provided with bearings for said driven shaft, a steering shaft mounted on the front end of said frame provided with handle bars on its upper end and with a yoke embracing said front wheel and on which said front wheel axle is rotatably mounted, a seat mounted on said frame forwardly of said rear wheel, and a driving shaft mounted on said frame disposed transversely thereof and provided with pedals and with a sprocket and a sprocket chain connecting said sprockets, the floating capacity of said wheels being such that the tricycle is operable in water, said tires constituting tread members when the tricycle is operated on a hard surface.

2. A tricycle usable on a hard surface and on water, comprising air chambered front and rear wheels, the rear wheels comprising rims and conical side walls fixedly connected thereto, the rims of the rear wheels being of equal and substantial width and having axially spaced annular ribs thereon and having axially spaced tire seats at the ends thereof, the side walls of the rear wheels projecting outwardly beyond the rims to provide outer walls for said tire seats, the rim of said front wheel being provided with a plurality of side by side tire seats, the side walls of said front wheel projecting outwardly beyond the rim to constitute the outer walls for the outer tire seats thereon, tires arranged in said tire seats, the tires on said front wheel being disposed in side by side lateral supporting relation to each other, inwardly tapering propeller blades disposed radially and in angularly spaced relation on the outer side walls of said rear wheels with their outer edges in inwardly spaced relation to the peripheries thereof, a rear axle, said rear wheels having tubular hubs sleeved upon and connected to said rear axle, said front wheel having an axle projecting laterally therefrom and to which the side walls of said front wheel are fixedly connected, a tubular driven shaft sleeved upon said rear axle between said hubs and drivingly connected thereto, a frame including laterally spaced rearwardly projecting members provided with bearings for said driven shaft, a steering shaft mounted on the front end of said frame provided with handle bars on its upper end and with a yoke embracing said front wheel and on which said front wheel axle is rotatably mounted, a seat mounted on said frame forwardly of said rear wheels, and a driving shaft mounted on said frame disposed transversely thereof and provided with pedals and drivingly connected to said driven shaft, the floating capacity of said wheels being such that the tricycle is operable in water, said tires constituting tread members when the tricycle is operated on a hard surface.

3. A tricycle usable on a hard surface and on water, comprising a frame provided with air chambered front and rear wheels, the rear wheels comprising rims and conical side walls fixedly connected thereto, the rims of the rear wheels being of equal and substantial width and having axially spaced tire seats at the ends thereof, the side walls of the rear wheels projecting outwardly beyond the rims to provide outer walls for said tire seats, the rim of said front wheel being provided with a plurality of side by side tire seats, the side walls of said front wheel projecting outwardly beyond the rim to constitute the outer walls for the outer tire seats thereon, tires arranged in said tire seats, the tires on said front wheel being disposed in side by side lateral supporting relation to each other, a seat mounted on said frame forwardly of said rear wheels, a driving shaft mounted on said frame disposed transversely thereof and provided with pedals and driving connections for said driving shaft to said rear wheels, the floating capacity of said wheels being such that the tricycle is operable in water, said tires constituting tread members when the tricycle is operated on a hard surface.

4. A tricycle comprising air chambered front and rear wheels, the rear wheels comprising rims and conical side walls fixedly connected thereto, inwardly tapering triangular propeller blades disposed radially and in angularly spaced relation on the outer side walls of said rear wheels with their outer edges in inwardly spaced relation to the peripheries thereof, the inner sides of said rear wheels having no projections thereon, a rear axle, said rear wheels having tubular hubs sleeved upon and connected to said rear axle, said front wheel having an axle projecting laterally therefrom and to which the side walls of said front wheel are fixedly connected, a tubular driven shaft sleeved upon said rear axle between said hubs and drivingly connected thereto, a driven sprocket disposed centrally on and drivingly connected to said driven shaft, a frame including laterally spaced rearwardly projecting members provided with bearings for said driven shaft, a steering shaft mounted on the front end of said frame provided with handle bars on its upper end and with a yoke embracing said front wheel and on which said front wheel axle is rotatably mounted, a seat mounted on said frame forwardly of said rear wheels, and a driving shaft mounted on said frame disposed transversely thereof and at the front of said rear wheels and provided with pedals and with a sprocket and a sprocket chain connecting said sprockets, the floating capacity of said wheels being such that the tricycle is operable in water.

5. A tricycle comprising air chambered front and rear wheels, the rear wheels comprising rims and side walls fixedly connected thereto, propeller blades disposed radially and in angularly spaced relation on the outer side walls of said rear wheels with their outer edges in inwardly spaced relation to the peripheries thereof, the inner sides of said rear wheels having no projections thereon, a rear axle, said rear wheels having tubular hubs sleeved upon and connected to said rear axle, a tubular driven shaft sleeved upon said rear axle between said hubs and drivingly connected thereto, a frame including laterally spaced rearwardly projecting members provided with bearings for said driven shaft, steering means mounted on the front end of said frame and on which said front wheel is rotatably mounted, a seat mounted on said frame forwardly of said rear wheels, a driving shaft mounted on said frame disposed transversely thereof and at the front of said rear wheels and having driving connection to said driven shaft, the floating capacity of said wheels being such that the tricycle is operable in water.

6. A tricycle comprising air chambered front and rear wheels, the rear wheels comprising cylindrical rims of substantial width and side walls fixedly connected thereto, propeller blades disposed radially and in angularly spaced relation on the outer side walls of said rear wheels with their outer edges in inwardly spaced relation to the peripheries thereof, the inner sides of said rear wheels having no projections thereon, a rear axle, said rear wheels having tubular hubs sleeved upon and connected to said rear axle, a tubular driven shaft sleeved upon said rear axle between said hubs and drivingly connected thereto, a frame including laterally spaced rearwardly projecting members provided with bearings for said driven shaft, steering means mounted on the front end of said frame and on which said front wheel is rotatably mounted, a seat mounted on said frame forwardly of said rear wheels, a driving shaft mounted on said frame disposed transversely thereof and at the front of said rear wheels and having driving connection to said driven shaft, the floating capacity of said wheels being such that the tricycle is operable in water.

References Cited in the file of this patent

UNITED STATES PATENTS

| | | |
|---|---|---|
| 1,104,229 | Szegel | July 21, 1914 |

FOREIGN PATENTS

| | | |
|---|---|---|
| 19,203 | Switzerland | Apr. 25, 1899 |
| 70,575 | France | May 29, 1959 |
| | (Addition to Patent No. 1,122,181) | |